PHOTO-ELECTRON IMAGE MULTIPLIER

Filed Nov. 25, 1957 3 Sheets-Sheet 1

INVENTOR
James Dwyer McGee
BY
Stevens, Davis, Miller & Mosher
ATTORNEYS

INVENTOR
James Dwyer McGee
BY
Stevens, Davis, Miller & Mosher
ATTORNEYS

INVENTOR

James Dwyer McGee

BY

Stevens, Davis, Miller & Mosher

ATTORNEYS

United States Patent Office 3,062,962

Patented Nov. 6, 1962

3,062,962

PHOTO-ELECTRON IMAGE MULTIPLIER

James Dwyer McGee, London, England, assignor to National Research Development Corporation, London, England Filed Nov. 25, 1957, Ser. No. 698,540
Claims priority, application Great Britain Nov. 30, 1956
17 Claims. (Cl. 250—213)

This invention relates to photo-electron image multipliers. In devices of this kind a photo-electron image, which may be produced by focusing a light image or an image of another form of energy upon a photo-emissive surface, provides a supply of electrons having some definite pattern in space. These electrons are accelerated or multiplied or otherwise provided with higher energy and, while still retaining substantially the same pattern in space, are caused to fall upon a screen, for example a fluorescent screen whereby the original electron image is reproduced as a visual image. Alternatively, the screen may be the storage electrode of a television signal generating tube.

The present invention is concerned with devices in which the surface area of the original photo-electron image is broken up into elemental areas, usually to provide a large number of such areas in both of two dimensions, each area being associated with a separate channel comprising a number of electron-multiplying stages and each channel extending from the area of the photo-electron image to the final screen.

The electron-multiplying stages are provided by a series of cellular electrodes, the aligned cells or apertures of consecutive electrodes forming the separate electron-multiplying channels.

The object of the invention is to provide photo-electron image multipliers having cellular electrodes of improved construction.

According to the present invention, a photo-electron image multiplier comprises a photo-electron image source, a screen for converting electron energy into energy of another form and a series of electrodes arranged between the said source and the said screen, in which the said electrodes are of cellular construction and are maintained at increasingly positive potentials from the electrode nearest the said source to the electrode nearest the said screen to provide a plurality of electron-multiplying channels, the axes of which channels are parallel straight lines extending through all the said electrodes. The cellular electrodes are furthermore of such shape that secondary electrons generated in one stage, of any channel, are constrained, by the electric field existing between consecutive cellular electrodes, to move in a curved path to the next cellular electrode. The great majority of these electrons are caused to remain in the same channel due, partly or solely to this electric field.

The cellular electrodes have plane-parallel faces to which the axes of the cells of the electrode may be oblique in one plane or normal.

The cells of the cellular electrodes may be open at the front end facing the photo-electron image source or they may be covered. If the cells are covered, they may either be provided with secondary-electron emissive inner walls and the front face of the electrode covered with a wire mesh grid or the cells may be covered by an electron permeable, secondary-electron emissive membrane.

The photo-electron image multipliers may have a solenoid surrounding the cellular electrodes to provide an axial focusing magnetic field. It is preferred to provide an axial focusing field when the spacing between consecutive cellular electrodes exceeds a few hundredths of an inch or if the electron image source is spaced sufficiently far from the front of the first cellular electrode or the final screen is spaced sufficiently far from the last cellular electrode that the electrons travelling between them would otherwise diverge sufficiently to produce an unacceptable degradation of the image.

In all of the constructions of photo-electron image multipliers according to the present invention, it is preferred to manufacture consecutive cellular electrodes as successive layers cut from a stack of tubes formed into a unitary structure.

In order that the invention may readily be carried out, a number of embodiments will now be particularly described, by way of example, with reference to the accompanying drawings, which are all of a diagrammatic nature and not drawn to scale, and in which.

Figure 10:
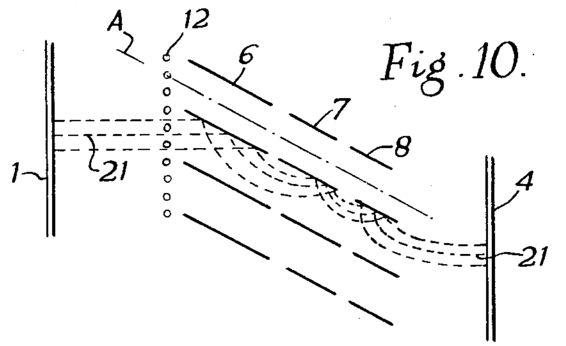
Figure 11:
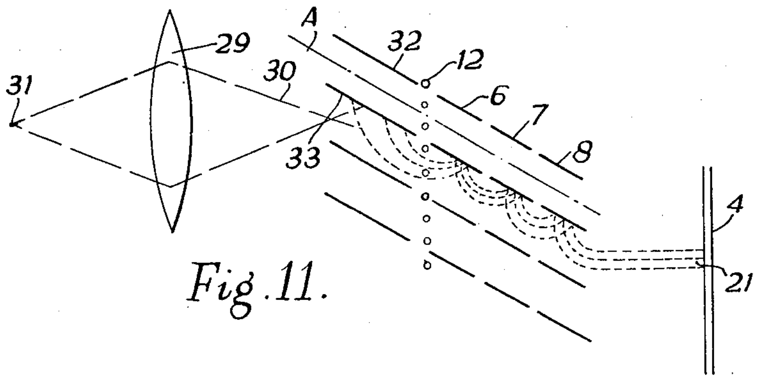

FIGURE 10 shows a different construction of photo-electron image multiplier in which the axes of the cellular electrodes are oblique in one plane perpendicular to the planes of the photo-electron image source and the final screen; and FIGURE 11 shows an arrangement, similar to the device of FIGURE 10 in having obliquely-cut cellular electrodes, but in which light rays instead of photo-electrons are incident upon the first cellular electrode.

Figure 1:
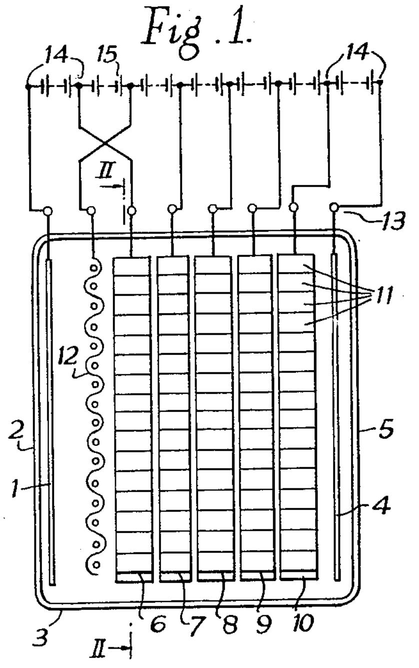
FIGURE 1 is a longitudinal sectional view of a photo-electron image multiplier having five cellular electrodes providing electron-multiplying stages.

In the device of FIGURE 1, a photo-cathode 1 is mounted behind the plane, transparent face 2 of a glass envelope 3. The arrangement is such that a light image may be focused on the photo-cathode 1, through the face 2, causing photo-electrons to be liberated from the rear surface of the photo-cathode. These photo-electrons form an electron image, by their distribution in the plane of the photo-cathode 1, corresponding to the light image focused upon the photo-cathode 1.

At the opposite end of the envelope 3 is mounted a fluorescent screen 4 for converting incident electrons into light energy, thereby producing a visual image which can be viewed through the transparent rear end 5 of the envelope 3.

Figure 2:
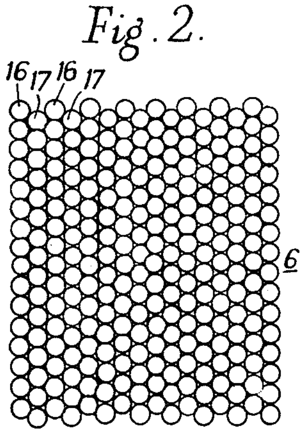
FIGURE 2 is a transverse sectional view in the plane II—II of FIGURE 1, showing the construction of the cellular electrodes.

Intermediately of the photo-cathode 1 and the screen 4 are arranged five cellular electrodes 6, 7, 8, 9 and 10. These electrodes each have a plurality of straight-sided cells, a number of which, in the cellulor electrodes 9 and 10, are indicated by the reference 11. These cells extend in two dimensions covering a rectangular area in planes parallel to the photo-cathode 1 and screen 4, as shown in FIGURE 2.

The cells may be of square, hexagonal, polygonal or circular cross-section, of the order of 0.01" to 0.04" diameter, but in the present example the cells are of circular cross-section, the cellular electrodes being manufactured from a stack of circular tubes, as explained below with reference to FIGURE 3. The length of the cellular electrodes 6–10 varies with the constructional form of the photo-electron image multiplier, as explained with reference to FIGURES 4 to 10.

The cellular electrodes 6–10 are arranged with corresponding cells in accurate alignment. The five corresponding cells of the five cellular electrodes together define a single channel between the photo-cathode 1 and the screen 4, the axis of which channel is a straight line normal to both the photo-cathode 1 and the screen 4. Front and back faces of successive cellular electrodes are spaced by 0.005" to 0.010" except for the constructions described with reference to FIGURES 8 to 11.

In front of the electrode 6, and insulated therefrom, is a wire mesh grid 12. The photo-cathode 1, grid 12, electrodes 6–10 and screen 4 all have connections brought out through the envelope 3 to a series of terminals 13 from which connections are made to tapping points 14 of a D.C. potential source shown as a battery 15, whereby the electrodes are maintained at potentials which are increasingly positive from the photo-cathode 1 to the screen 4, except for the grid 12 which is positive with respect to both the electrode 6 and the photo-cathode 1.

As shown in FIGURE 2, the cellular electrode 6 is made up from rows and columns of circular tubes 16 with further rows and columns of similar tubes 17 arranged between to form a compact stack. In the example illustrated, the face of the stack covers a rectangular area comprising sixteen vertical and sixteen horizontal tubes providing 16×16 cells in the electrode. The electrodes 7 to 10 are of identical construction, as explained more fully below, so that 16×16 channels are provided throughout the photo-electron image multiplier illustrated in FIGURES 1 and 2.

That is to say, the rectangular area of the photo-cathode 1 is, in effect, divided into 16×16 elemental areas, each area having its separate electron-multiplying channel extending to the fluorescent screen 4 where the impinging electrons excite fluorescence in 16×16 elemental areas to reproduce the original optical and photo-electron images.

Obviously, the greater the number of elemental areas provided, the greater the detail of the image reproduced on the fluorescent screen 4. The electron multiplying action of each channel, as explained with reference to FIGURES 4 to 11, is the same for every channel of a particular embodiment regardless of the number of channels provided.

Figure 3:
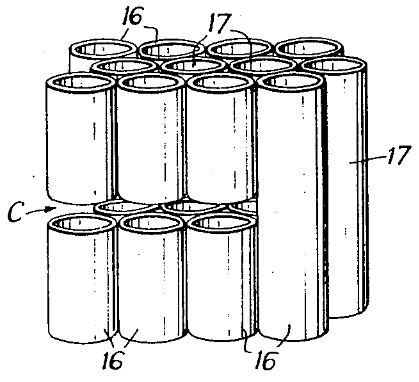
FIGURE 3 is a perspective view of a part of a structure from which the cellular electrodes are manufactured and FIGURE 3*a* is an end view of part of the structure shown in FIGURE 3.
Figure 3A:
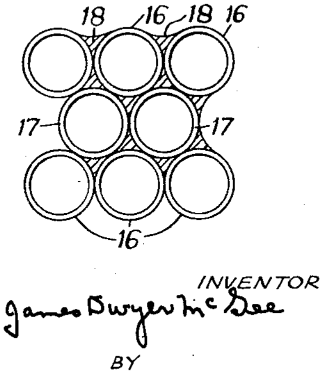

As illustrated in FIGURES 3 and 3*a*, the cellular electrodes 6–10 are manufactured from a single stack of tubes 16, 17 arranged in staggered series of columns and rows as shown in FIGURE 2. The outer surfaces of the tubes are coated with a flux and the tubes 16, 17 united to form a unitary structure, by allowing a suitable solder to flow in the interstices, as shown in FIGURE 3*a* by the shaded areas 18. The tubular structure is then cut into cellular sections of required length, a partially completed cut C being shown in FIGURE 3.

The insides of the cells of each electrode are coated to provide a surface having good secondary electron emissive properties. One very satisfactory coating is a layer of antimony activated by caesium. Alternatively the coating may be bismuth activated by caesium or another of the alkali metals.

In the assembly of the tubes 16, 17 into a unitary structure, small irregularities in the arrangement of the individual tubes is unavoidable in practice. This results in corresponding irregularities in the cellular structure of all the electrodes made from the same stack. One advantage provided by the present invention is that successive cellular electrodes 6–10 may be made from successive sections cut from the same stack of tubes. The same irregularities then appear in all the electrodes and, when the electrodes as a whole are once aligned, all the cells are then aligned regardless of such irregularities. The irregularities in the cellular electrodes 6–10 do not impair the operation of the photo-electron image multiplier but merely affect the regularity of the elemental areas into which the image is divided.

An alternative construction of the cellular electrodes, suitable for embodiments of the invention in which the axes of the cells are normal to the plane parallel faces of the electrodes, comprises a plate of suitable glass, such as that known as "Photoform" glass and manufactured by Cornings Ltd., which is etched to give a cellular structure. The surface of the structure is then made conductive by depositing a coating of a suitable metal by evaporation.

Figure 4:
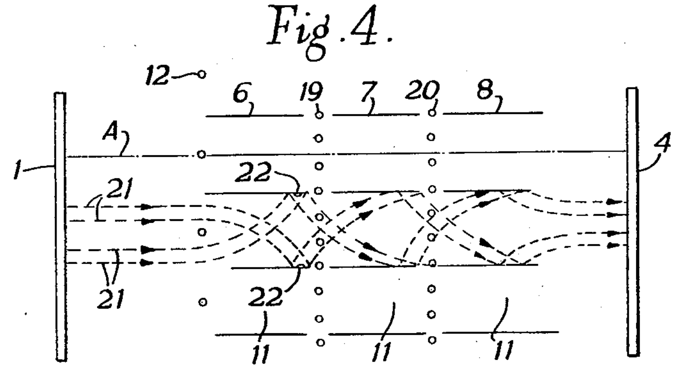
FIGURE 4 is a diagram showing the construction and operation of one form of photo-electron image multiplier according to the invention.

FIGURE 4 shows one construction having a photo-cathode 1, three electron-multiplying electrodes 6, 7, and 8 and a fluorescent screen 4. Only three of the many channels are shown, the corresponding cells 11 of the three electrodes 6, 7 and 8 being accurately aligned to provide three channels, the axes of which are parallel straight lines. One channel axis is shown by the chain line A.

Between the photo-cathode 1 and the first cellular electrode 6 is a wire mesh grid 12 which is insulated from the electrode 6. The grid 12 is maintained at a potential about 50 volts positive with respect to the electrode 6 and the electrode 6 is maintained about 200 volts positive relatively to the photo-cathode 1.

Across the front face of each of the electrodes 7 and 8 is arranged a wire mesh grid 19 and 20 respectively which is electrically connected to the electrodes 7 and 8 respectively. The electrodes 7, 8 and the screen 4 are maintained at progressively positive potentials the potential difference between successive electrodes being from 200 volts to 500 volts.

The paths of electrons from the photo-cathode 1 through successive electron-multiplying stages of the middle channel of the three channels shown are exemplified by the dotted lines 21. Electrons leaving an area of the photo-cathode 1 opposite the middle channel are attracted towards the grid 12 by the positive potential thereon. The electrons pass through the grid 12 and are thereafter deflected into a curved path by the field between the electrode 6 and the grid 12 so that they strike the inner surface 22 of the cell. This impact liberates secondary electrons in greater number than the incident primary electrons, by, say some five times to ten times, so that the electron energy in the channel is thereby increased, so long as more than some 10% to 20% of the primary electrons release secondaries. It can be arranged that appreciably more than half the primary electrons strike the cell walls, so that effective electron multiplication in each stage is ensured.

These secondary electrons are, in turn, attracted onto the next electrode 7 following a curved path whereby electrons from one cell of electrode 6 tend to enter the corresponding cell of electrode 7, thus remaining in the same channel, and strike off further secondary electrons by impact with the inner surface of electrode 7.

This augmented flow of secondaries is similarly attracted along a curved path to liberate further secondary electrons in the final cellular electrode 8. These last-liberated secondary electrons, together with primary electrons from earlier stages, form an electron stream containing a considerably increased number of electrons which strike the fluorescent screen 4 to produce a light spot corresponding in brightness to the incident electron energy.

Each channel of the device operates in similar manner, the initial magnitude of the photo-electron stream in each elemental area being amplified in the corresponding channel and thus producing a corresponding, though increased, electron energy incident on the fluorescent screen 4 in the corresponding elemental area. Thus the original photo-electron image is intensified and converted into a corresponding optical image.

By reason of the construction of the cellular electrodes 6, 7 and 8 and the electric fields acting between them, it is improbable that an electron from one channel will escape into an adjoining channel, so that the initial image detail is but little degraded in the final visual image.

Figure 5:
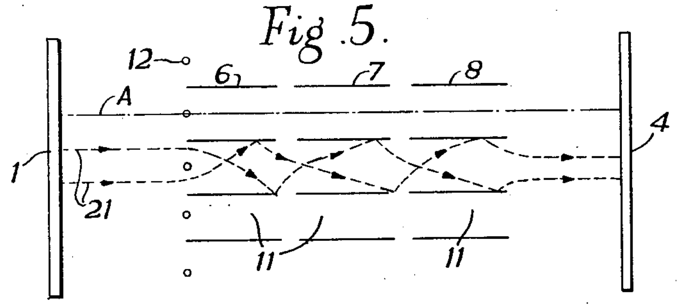
FIGURE 5 is a diagram showing the construction and operation of a photo-electron image multiplier of different form.

The construction shown in FIGURE 5 is similar to that shown in FIGURE 4, corresponding parts being indicated by the same reference numerals. However, the wire mesh grids, 19, 20 of FIGURE 4 are omitted, the cellular electrodes 7 and 8 of FIGURE 5 being made deeper between faces to provide longer cells in relation to the cell diameter than in the corresponding electrodes of FIGURE 4.

Figure 6:
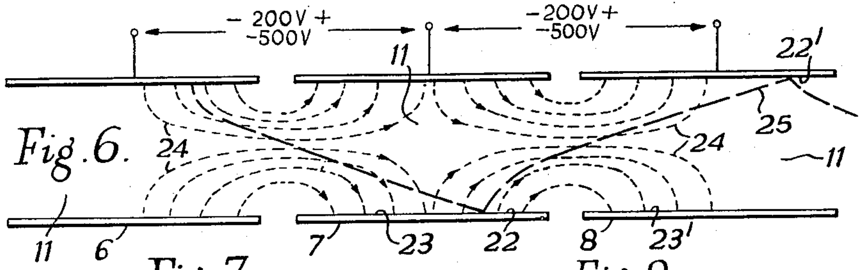
FIGURE 6 is a diagram showing the nature of the electric fields maintained between successive cellular electrodes of a device as shown in FIGURE 5.

Whereas, in the arrangement of FIGURE 4, the field due to the potential of the preceding electrode is prevented from penetrating the cellular electrodes 7 and 8 by the grids 19 and 20 respectively, in the arrangement of FIGURE 5, the electric fields extend into the front part of the cells as shown in FIGURE 6.

In FIGURE 6, three cells 11 of consecutive electrodes 6, 7 and 8 are maintained at increasing positive potentials with a potential difference of 200 volts to 500 volts between consecutive pairs. With equal potential differences and spacing between the electrodes, the electric fields produced are as shown in the figure by the dotted lines 24. Considering the electrode 7, it will be seen that there is a front region 23 inside the cell where the direction of lines of electric force, and hence the direction of acceleration of an electron in the region, is into the cell and towards the cell wall. Beyond the region 23 is a region 22 where the direction of the lines of force is towards the next electrode and away from the cell wall.

The path of an imagined electron is shown by the broken line 25. A secondary electron leaving the electrode 6 describes a curved path which, due to the length of the cell of electrode 7 in relation to its diameter, causes the electron to strike the opposite wall of the cell of electrode 7 in the region 22. An increased number of secondaries liberated from electrode 7 follow a similar, curved path striking the electrode 8 in the corresponding region 22', and so on.

Figure 7:
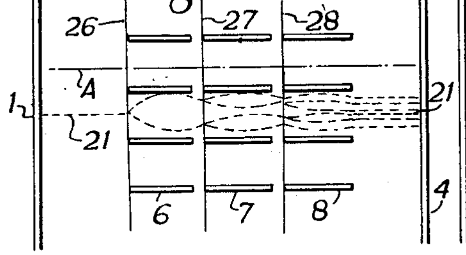
FIGURE 7 shows the construction and manner of operation of a photo-electron image multiplier in which secondary electrons are liberated in each stage by the passage of primary electrons through a thin membrane.

FIGURE 7 shows the first of three embodiments in which the front face of the cellular electrodes is covered by an electron-permeable and secondary-electron emissive membrane.

In FIGURE 7, three channels are shown of a photo-electron image multiplier comprising a photo-cathode 1, a fluorescent screen 4 and three intermediate electron-multiplying stages having cellular electrodes 6, 7 and 8. The axes of the cells and of the three separate channels formed by the cells are parallel straight lines, one axis being indicated by the chain line A.

The electrodes 6, 7, 8 and 4 are maintained at potentials increasingly positive with respect to the photo-cathode 1, the potential difference between consecutive pairs being 200 volts to 500 volts.

The front faces of the cellular electrodes are covered with thin membranes 26, 27 and 28 respectively. A number of alternative membranes are practicable. One such membrane comprises a support of very thin silica film. On the face of this supporting film opposite that at which incident primary electrons arrive is a deposited, thin film of antimony which is exposed to caesium vapour and activated, in the manner known for photo-electric cells. In this way, an electron-permeable and secondary-electron emissive layer is provided.

Alternatively, the supporting layer may be an aluminium oxide film upon which the antimony layer is deposited and activated by caesium.

As further alternatives, the secondary-electron emissive layer may be bismuth activated by caesium or by any other of the alkali metals.

As still further alternatives, the membrane may be a self-supporting film of antimony combined with caesium, as used in a photo-sensitive layer, or it may comprise a film of antimony combined with caesium supported on a thin film of silica or aluminium oxide.

The operation of a device according to FIGURE 7 is similar to that of the devices previously described. The path of a photo-electron leaving the photo-cathode 1 is indicated by the dotted lines 21. As shown, the electron is attracted to the first cellular electrode 6 where it strikes and penetrates the membrane 26, releasing a number of secondary electrons in so doing. These travel to the electrode 7 penetrating the membrane 27 and releasing further secondary electrons. These, in turn, travel to the electrode 8, releasing further secondary electrons from the membrane 28 and the electrons resulting from all these operations strike the fluorescent screen 4 causing the elemental area struck to fluoresce.

As shown in the figure, the cellular electrodes 6, 7 extend so that the rear face is close to the front face of the next cellular electrode 7, 8 respectively, the distance separating them being about 0.005" to 0.010". By this means, straying of electrons from one channel to an adjacent channel, with consequent degradation of the image, is largely prevented.

Figure 8:
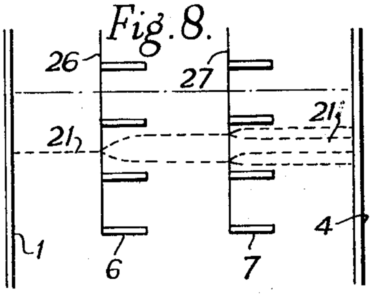
FIGURE 8 shows a modification of the device of FIGURE 7.

The device shown in FIGURE 8 is similar to that shown in FIGURE 7, in that the front faces of the cellular electrodes are covered by an electron-permeable, secondary-electron emissive membrane and similar elements are indicated by the same reference numerals. In this example, only two such electrodes 6 and 7 are shown. The operation of the device is also similar to that of the device of FIGURE 7 as shown by the electron paths 21. However, in the case of FIGURE 8, the cellular electrodes 6, 7 are shorter and the spacing between faces of consecutive electrodes is greater. The confinement of secondary electrons to the channel in which they originate is partly obtained by the physical screening effect of the cell walls and partly by applying a higher order of potential difference between consecutive electrodes. In this arrangement the potential between consecutive cellular electrodes may be 1,000 volts to 2,000 volts.

Figure 9:
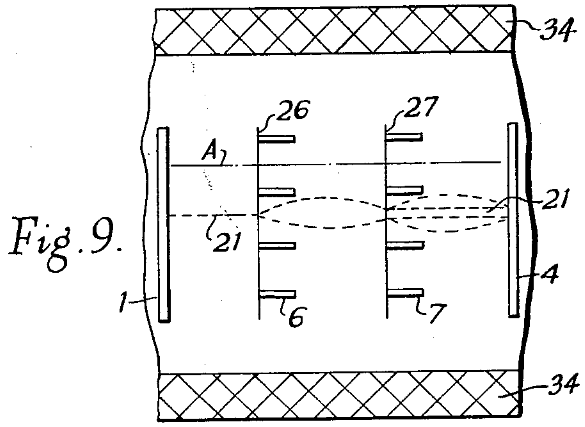
FIGURE 9 shows a modification of the device of FIGURE 8 using auxiliary magnetic focusing.

The construction of the device of FIGURE 9 is the same as that of the device of FIGURE 8 and similar parts are indicated by the same reference numerals. The spacing between faces of consecutive electrodes is large but the potential difference is the same as for the device of FIGURE 7. An additional focusing effect is, in this case, provided by a current-carrying solenoid 34 which surrounds the device and provides an axial magnetic field.

The devices shown in FIGURES 10 and 11 differ from those of the earlier figures in that the faces of the cellular electrodes are cut parallel but obliquely to the axes of the cells, at an angle of 60° to 70° in the plane of the drawing. The corresponding cells of the cellular electrodes are aligned to form channels on parallel axes, one of which is shown at A. These axes are oblique to the plane of a fluorescent screen 4.

The device of FIGURE 10 has a photo-cathode 1, a fluorescent screen 4 and three intermediate cellular electrodes 6, 7 and 8. The electrodes 6, 7 and 8 are spaced apart by about 0.020". In front of the electrode 6, and insulated therefrom, is a wire mesh grid 12. This grid is maintained about 50 volts positive with respect to the electrode 6 and the electrode 6 is about 200 volts to 500 volts positive relatively to the photo-cathode 1. The electrodes 7, 8 and 4 are maintained at potentials which are increasingly positive, in that order, by potential differences of about 200 volts to 500 volts.

The paths of photo-electrons from the photo-cathode 1 and of subsequent secondary electrons are indicated by the dotted lines 21. If a point on the axis of a channel, between the electrode 6 and the electrode 7, be considered, it will be seen that the more positive cell wall of electrode 7 extends above the axis, as viewed in FIGURE 10, and the more negative cell wall of electrode 6 extends below the axis. Electrons are thus attracted to the electrode 7 and describe the curved path between the two electrodes shown by the dotted lines 21 in the figure. A similar curved path is described by electrons between the electrodes 7 and 8. Electrons emerging from the electrode 8 travel to the fluorescent screen 4 which is thereby caused to fluoresce to reproduce the original photo-electron image at the photo-cathode 1.

The device shown in FIGURE 11 is similar to that shown in FIGURE 10 in that it comprises three cellular, electron-multiplying electrodes 6, 7 and 8 and a fluorescent screen 4 maintained at increasingly positive potentials. Similarly, a wire mesh grid 12 is provided in front of the electrode 6 and maintained at a potential of about 50 volts positive relatively thereto.

In front of the grid 12 and axially aligned with the electrodes 6, 7 and 8, is a cellular-electrode 32 having its faces parallel but similarly obliquely cut to the cell axes.

In front of the electrode 32 is a lens system 29 adapted to direct light rays 30 from a focus or source 31 to form an optical image in the plane of the front face of the electrode 32. The inner faces 33 are coated with photo-emissive material so that the electrode 32 constitutes a photo-cathode. Photo-electrons from the electrode 32 travel into the cellular electrode structure 6, 7, 8 to produce secondary electrons in a similar manner as described with reference to FIGURE 10 and as shown by the dotted lines 21 in FIGURE 11.

As an alternative to the constructions shown in FIGURES 10 and 11, the cellular electrodes 6, 7 and 8 may be provided with wire mesh grids in front of and in contact with the electrodes, as in the construction described with reference to FIGURE 4.

I claim:

1. A photo-electron image multiplier comprising a photo-electron image source, a screen for converting electron energy into energy of another form and a series of electrodes arranged between the said source and the said screen, in which the said electrodes are of cellular construction and are maintained at increasingly postive potentials from the electrode nearest the said source to the electrode nearest the said screen to provide a plurality of electron-multiplying channels, the axes of which channels are parallel straight lines extending through all the said electrodes and in which the cellular electrodes are of such shape that secondary electrons generated in one stage, of any channel, are constrained by the electric field existing between consecutive cellular electrodes, to move in a curved path to the next cellular electrode, substantially all of the said electrons travelling to the corresponding channel of the next electrode.

2. A photo-electron image multiplier as claimed in claim 1, in which the cellular electrodes are open ended and have their faces lying in parallel planes to both of which planes the axes of the channels are normal.

3. A photo-electron image multiplier as claimed in claim 2, in which the cellular electrode of the first electron-multiplying stage has a wire mesh grid arranged before its face which is directed towards the said source, the said grid being maintained at a potential which is positive with respect both to the said source and to the said first cellular electrode.

4. A photo-electron image multiplier as claimed in claim 3, in which the cellular electrodes of subsequent electron-multiplying stages each have a wire mesh grid covering the electrode face directed towards the said source and electrically connected to the electrode.

5. A photo-electron image multiplier as claimed in claim 1, in which all the cellular electrodes have their faces directed towards the said source covered by an electron-permeable secondary-electron emissive membrane.

6. A photo-electron image multiplier as claimed in claim 5, in which the said membrane comprises a supporting layer of silica on the face of which remote from the said source, is deposited a layer of antimony which is activated by caesium.

7. A photo-electron image multiplier as claimed in claim 5, in which the space between faces of consecutive cellular electrodes is of the order 0.005" to 0.010".

8. A photo-electron image multiplier as claimed in claim 5, in which the space between faces of consecutive cellular electrodes is greater than 0.010" and the cellular electrodes are surrounded by a solenoid providing an axial focusing magnetic field.

9. A photo-electron image multiplier as claimed in claim 1, in which the cellular electrodes have plane parallel faces cut obliquely in one plane to the axes of the cells thereof.

10. A photo-electron image multiplier as claimed in claim 9, in which the photo-electron image source is a further cellular electrode with obliquely-cut plane parallel faces, arranged in relation to the other cellular electrodes so that the cells thereof are aligned on parallel, straight line axes, the inner walls of said further cellular electrode providing a photo-emissive surface.

11. A photo-electron image multiplier comprising a photo-electron image source, a screen for converting electron energy into energy of another form and a series of electrodes arranged between the said source and the said screen, in which the said electrodes are of cellular construction and are maintained at increasingly positive potentials from the electrode nearest the said source to the electrode nearest the said screen to provide a plurality of electron-multiplying channels, the axes of which channels are parallel straight lines extending through all the said electrodes and in which the cellular electrodes are of such shape that secondary electrons generated in one stage, of any channel, are constrained by the electric field existing between consecutive cellular electrodes, to move in a curved path to the next cellular electrode, substantially all of the said electrons travelling to the corresponding channel of the next electrode, said cellular electrodes being open ended and having their faces lying in parallel planes to both of which planes the axes of the channels are normal, said cellular electrode of the first electron-multiplying stage having a wire mesh grid arranged before its face which is directed towards the said source, the said grid being maintained at a potential which is positive with respect both to the said source and to the said first cellular electrode and said cellular electrodes of subsequent electron multiplying stages having cells of such length in relation to their diameter that electrons from the preceding electrode enter the cells by a curved path to strike the inner cell wall in a region where the direction of electric field is away from the cell wall and towards the next following electrode.

12. A photo-electron image multiplier comprising a photo-electron image source, a screen for converting electron energy into energy of another form and a series of electrodes arranged between the said source and the said screen, in which the said electrodes are of cellular construction, comprising axially aligned tubular secondary-emissive cells, and are maintained at increasingly positive potentials from the electrode nearest the said source to the electrode nearest the said screen to provide a plurality of electron-multiplying channels, and in which the tubular cells of the electrodes are of such shape that secondary electrons generated in one cell, of any electrode except the last of said series, are constrained by the electric field existing between consecutive cellular electrodes, to move in a curved path to the next cellular electrode, substantially all of the said electrons travelling to the axially aligned cell of the next electrode, each of said series of cellular electrodes comprising juxtaposed elongated tubular cells.

13. A photo-electron image multiplier as claimed in claim 12, each of said series of cellular electrodes comprising solder-joined elongated tubular cells.

14. A photo-electron image multiplier as claimed in claim 12, in which the said series of cellular electrodes are formed from a common bundle of united juxtaposed tubes, each said electrode consisting of a section of the said bundle parted off along a plane transverse of the tube axes.

15. A photo-electron image multiplier as claimed in claim 1, the cellular electrodes all being formed from a common bundle of united juxtaposed tubes, successive electrodes being formed by successive sections cut from the bundle in parallel planes.

16. A photo-electron image multiplier as claimed in claim 11, the cellular electrodes all being formed from a common bundle of united juxtaposed tubes, successive electrodes being formed by successive sections cut from the bundle in parallel planes.

17. A photo-electron image multiplier as claimed in claim 12, the cellular electrodes all being formed from a common bundle of united juxtaposed tubes, successive electrodes being formed by successive sections cut from the bundle in parallel planes.

References Cited in the file of this patent

UNITED STATES PATENTS

| | | |
|---|---|---|
| 2,147,756 | Ruska | Feb. 21, 1939 |
| 2,254,617 | McGee | Sept. 2, 1941 |
| 2,264,269 | Banks | Dec. 2, 1941 |
| 2,423,124 | Teal | July 1, 1947 |
| 2,495,697 | Chilowsky | Jan. 31, 1950 |
| 2,579,665 | Green | Dec. 25, 1951 |
| 2,645,734 | Rajchman | July 14, 1953 |
| 2,646,521 | Rajchman | July 21, 1953 |
| 2,674,661 | Law | Apr. 6, 1954 |
| 2,702,259 | Sommer | Feb. 15, 1955 |
| 2,821,637 | Roberts et al. | Jan. 28, 1958 |
| 2,872,721 | McGee | Feb. 10, 1959 |
| 2,896,088 | Lempert | July 21, 1959 |

FOREIGN PATENTS

| | | |
|---|---|---|
| 901,819 | Germany | Jan. 14, 1954 |